(12) United States Patent
Schroeder et al.

(10) Patent No.: US 10,862,364 B2
(45) Date of Patent: Dec. 8, 2020

(54) CONNECTION PLATE FOR AN ELECTRIC MACHINE

(71) Applicant: SEG Automotive Germany GmbH, Stuttgart (DE)

(72) Inventors: Bernd Schroeder, Renningen (DE); Martin Henger, Tamm (DE)

(73) Assignee: SEG AUTOMOTIVE GERMANY GMBH, Stuttgart (DE)

( * ) Notice: Subject to any disclaimer, the term of this patent is extended or adjusted under 35 U.S.C. 154(b) by 0 days.

(21) Appl. No.: 16/347,523

(22) PCT Filed: Oct. 27, 2017

(86) PCT No.: PCT/EP2017/077584
§ 371 (c)(1),
(2) Date: May 3, 2019

(87) PCT Pub. No.: WO2018/083022
PCT Pub. Date: May 11, 2018

(65) Prior Publication Data
US 2019/0363604 A1 Nov. 28, 2019

(30) Foreign Application Priority Data
Nov. 4, 2016 (DE) .................. 10 2016 221 681

(51) Int. Cl.
*H02K 5/14* (2006.01)
*H02K 5/24* (2006.01)

(52) U.S. Cl.
CPC .............. *H02K 5/141* (2013.01); *H02K 5/24* (2013.01)

(58) Field of Classification Search
CPC .......... H02K 5/24; H02K 5/141; H01R 39/08; H01R 39/18; H01R 39/38
USPC .................. 310/51, 128, 143, 147, 232, 239
See application file for complete search history.

(56) References Cited

U.S. PATENT DOCUMENTS 4,730,135 A  3/1988 Dolderer et al.
2015/0229178 A1* 8/2015 Murakami .............. H02K 3/38
310/71

FOREIGN PATENT DOCUMENTS

| CN | 1351405 A | 5/2002 | |
|---|---|---|---|
| DE | 35 33 115 A1 | 3/1987 | |
| DE | 10 2008 040112 A1 | 1/2010 | |
| EP | 1 202 436 A1 | 5/2002 | |
| EP | 1202436 A1 * | 5/2002 | ............. H02K 5/145 |

OTHER PUBLICATIONS

International Patent Application No. PCT/EP2017/077584, International Search Report (ISR) and Written Opinion dated Jan. 29, 2018—12 pages.
Chinese Patent Application No. 201780068248.3; Office Action dated Aug. 5, 2020; 14 pgs.

* cited by examiner

*Primary Examiner* — Thomas Truong
(74) *Attorney, Agent, or Firm* — Lathrop GPM LLP

(57) ABSTRACT

The invention relates to a connection plate for an electric machine, which can be connected to a stator or a stator-side component, wherein at least one axially protruding pressing element is integrally formed on the connection plate.

7 Claims, 4 Drawing Sheets

CONNECTION PLATE FOR AN ELECTRIC MACHINE

CROSS-REFERENCE TO RELATED APPLICATIONS

Figure 1:
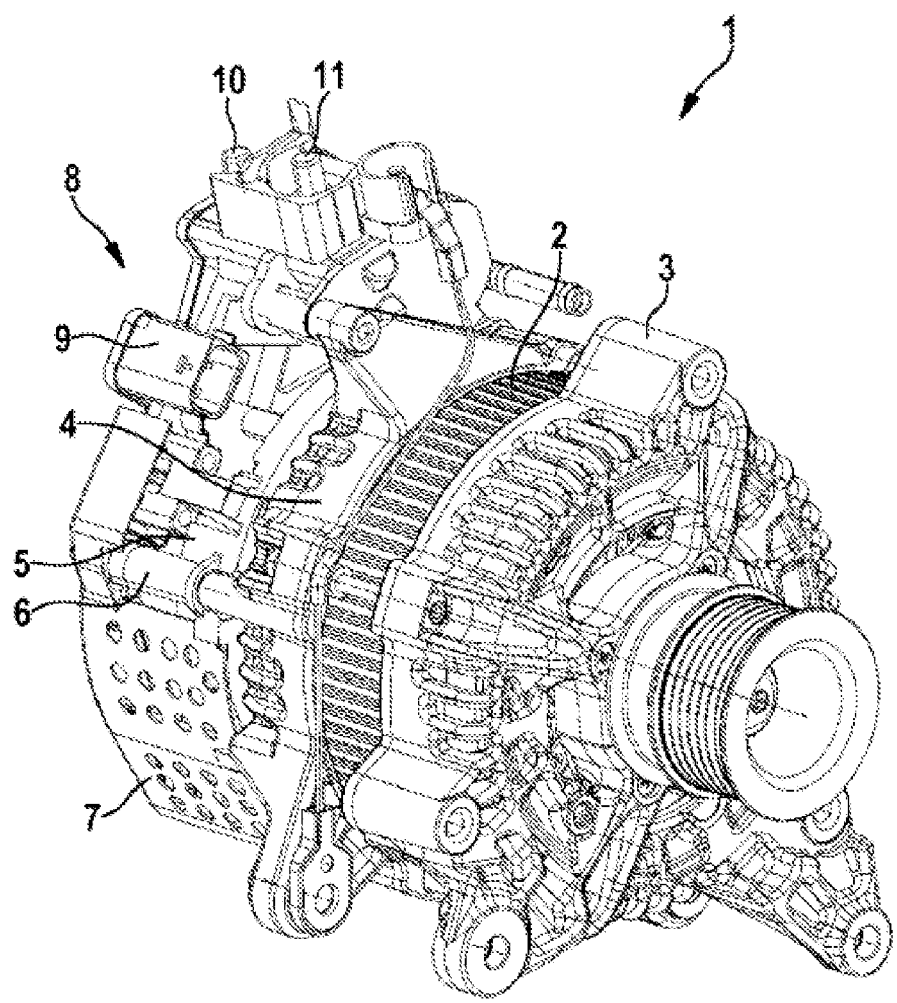

This application is a 35 U.S.C. § 371 filing of International Application No. PCT/EP2017/077584 filed Oct. 27, 2017, which claims the benefit of priority to German Patent Application No. 10 2016 221 681.3 filed Nov. 4, 2016, each of which is incorporated herein by reference in its entirety.

The invention refers to a connection plate for an electric machine for electrical contacting of stator-side windings according to the preamble of claim 1.

PRIOR ART

DE 35 33 115 A1 describes an alternating current generator for an internal-combustion engine, whose stator is arranged between bearing shields, wherein a bearing plate with an integrated connection plate is arranged on a bearing shield. The connection plate is used for the electrical contacting of windings in the stator, wherein the connection plate is used for the connection with power electronics for the transmission of the phase current to the windings. The rotor shaft is rotatably incorporated in a bearing shield and carries slip rings for electrical contacting of rotor-side windings.

DISCLOSURE OF THE INVENTION

The connection plate according to the invention can be used in stators of electric machines such as generators in motor vehicles. The connection plate can be used to connect stator-side windings to power electronics in order to conduct a phase current from the power electronics via the connection plate to the windings. The connection plate is located in particular on an axial front side of the electric machine and is formed as a separate component, but can be connected to the stator or a stator-side component via connecting elements. The connection plate can itself be the support of the power electronics.

The connection plate preferably consists of a plastic material.

At least one axially protruding pressing element is integrally formed on the connection plate—in relation to the axial longitudinal axis of the stator and electric machine—, wherein the axially protruding pressing element abuts on the stator or the stator-side component to which the connection plate is connected in the installed state of the connection plate. The connecting force caused by the connecting elements deforms the protruding or projecting pressing element. The deformation occurs either in the plastic or in the elastic area of the material of the connection plate.

The pressing element deformed by the connection, therefore, abuts directly on the stator or the stator-side component to which the connection plate is connected. Additionally, it is advantageous that at least one additional contact point of the connection plate is in contact with the stator or the stator-side component, wherein this contact point of the connection plate abuts deformation-free on the stator or the stator-side component. Accordingly, there is at least one pressing element on the connection plate which deforms when connected to the stator or stator-side component, and one deformation-free contact point on the connection plate which is also in contact with the stator or the stator-side component. The part of the connection plate that carries the pressing element remains deformation-free in the preferred design even under the action of the connecting forces.

This design has the advantage that the elastic or plastic deformation of the pressing element creates a local tension in the connection plate, which reduces or prevents undesirable natural vibrations of the connection plate. The local tension caused by the deformation of the pressing element on the connection plate changes the vibration modes, in particular, the natural vibration frequencies of the connection plate, preferably in the direction of higher natural frequencies, whereby a detuning with the excitation frequencies of the electric machine can be achieved. Accordingly, resonances in the connection plate, which otherwise lead to high vibration amplitudes, can be avoided.

It is advantageous that at least one axially projecting pressing element is located on the front side of a connection plate part placed centrally in the connection plate. The connection plate part, for example, is a hollow-cylindrical receiving socket for one or more slip rings, which are part of a commutation device for current transmission to rotor-side windings and rotate together with the rotor shaft. The projecting pressing element is located on the front side of the receiving socket and projects axially above the front side. When the connection plate is connected to the stator or the stator-side component, the pressing element comes into contact with the stator or the stator-side component and is deformed elastically or plastically with increasing connecting force. If necessary, if the pressing element is sufficiently deformed, the front side of the receiving socket also comes into contact with the stator or the stator-side component and forms the deformation-free contact point of the connection plate. Additionally or alternatively, there may also be one or more other contact points on the connection plate which come into contact with the stator or the stator-side component during the connection, but which remain deformation-free.

The centrally positioned receiving socket is connected to an outer ring of the connection plate via radial support arms, in accordance with another advantageous design. This means that a recess can be made in the connection plate between the support arms to save material and weight. The increased vibration capability of the central receiving socket, which is held by the radial support arms, can be counteracted by the deformation of the projecting pressing element at least for the excitation frequencies which occur during operation of the electric machine.

According to another advantageous design, the pressing element is formed as an axially protruding knob. If necessary, several axially protruding knobs may be present, in particular along a circle, e.g. at the front side of the centrally arranged receiving socket. Additionally, or alternatively, it is also possible for the pressing element to be formed as an axial pressing rib, which, for example, is arranged on the outside of the outer casing of the receiving socket and protrudes axially beyond the front side of the receiving socket.

The axial pressing path of the pressing element in relation to the directly adjacent portions on the connection plate is preferably between 0.1 mm and 1 mm. It is advantageous that the axial projection of the pressing element compared to the directly adjacent portions on the connection plate is at least 0.1 mm to 1 mm. This design ensures that the connecting force between the connection plate and stator or the stator-side component deforms the pressing element in the area of the axial projection, wherein the pressing element may be deformed to such an extent that the directly adjacent portions, opposite which the pressing element protrudes beyond in the undeformed state, come into abutment with the stator or the stator-side component.

The deformation of the pressing element during assembly with the stator or the stator-side component is achieved in particular by the fact that the pressing element has a small front surface which comes into contact with the stator or the stator-side component. The connecting forces exert high pressure on the pressing element, which leads to the deformation. If necessary, the deformation can also be supported by a smaller wall thickness of the pressing element.

The stator-side component, for example, is a heat sink that is connected to the connection plate via screws and to a bearing shield on the stator. The pressing element abuts on the heat sink.

The invention also refers to a stator of an electric machine, for example, a generator, which is provided with a connection plate as described above. Finally, the invention also refers to an electric machine, for example, a generator, with a stator and a connection plate as described above.

Figure 2:
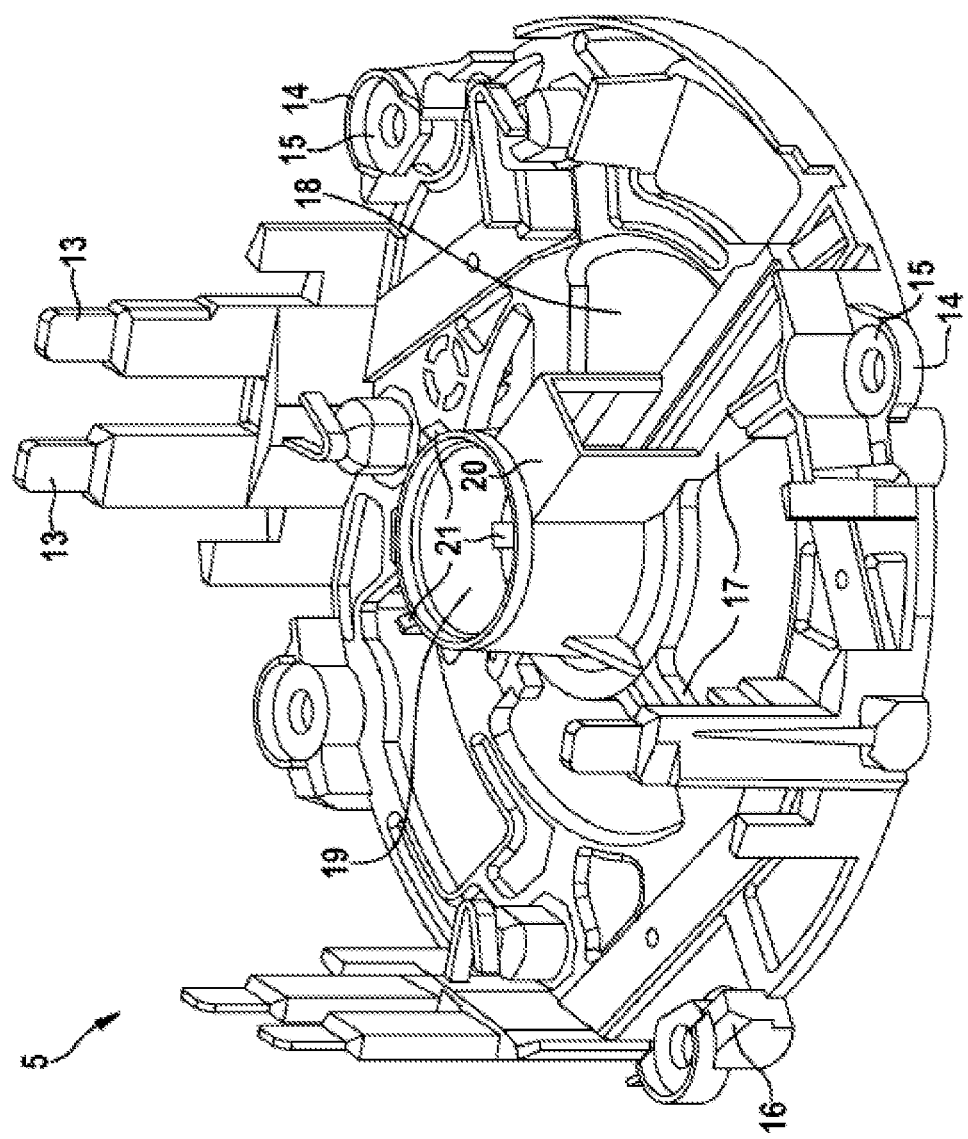
Figure 3:
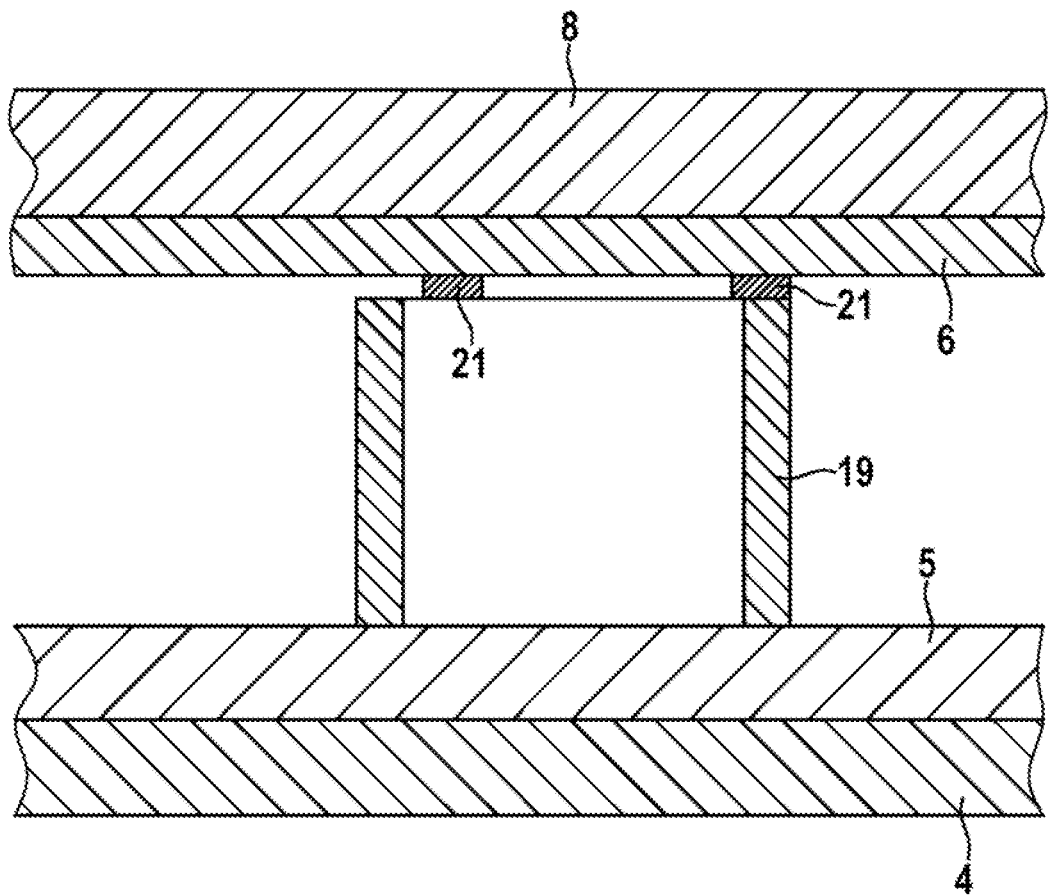
Figure 4:
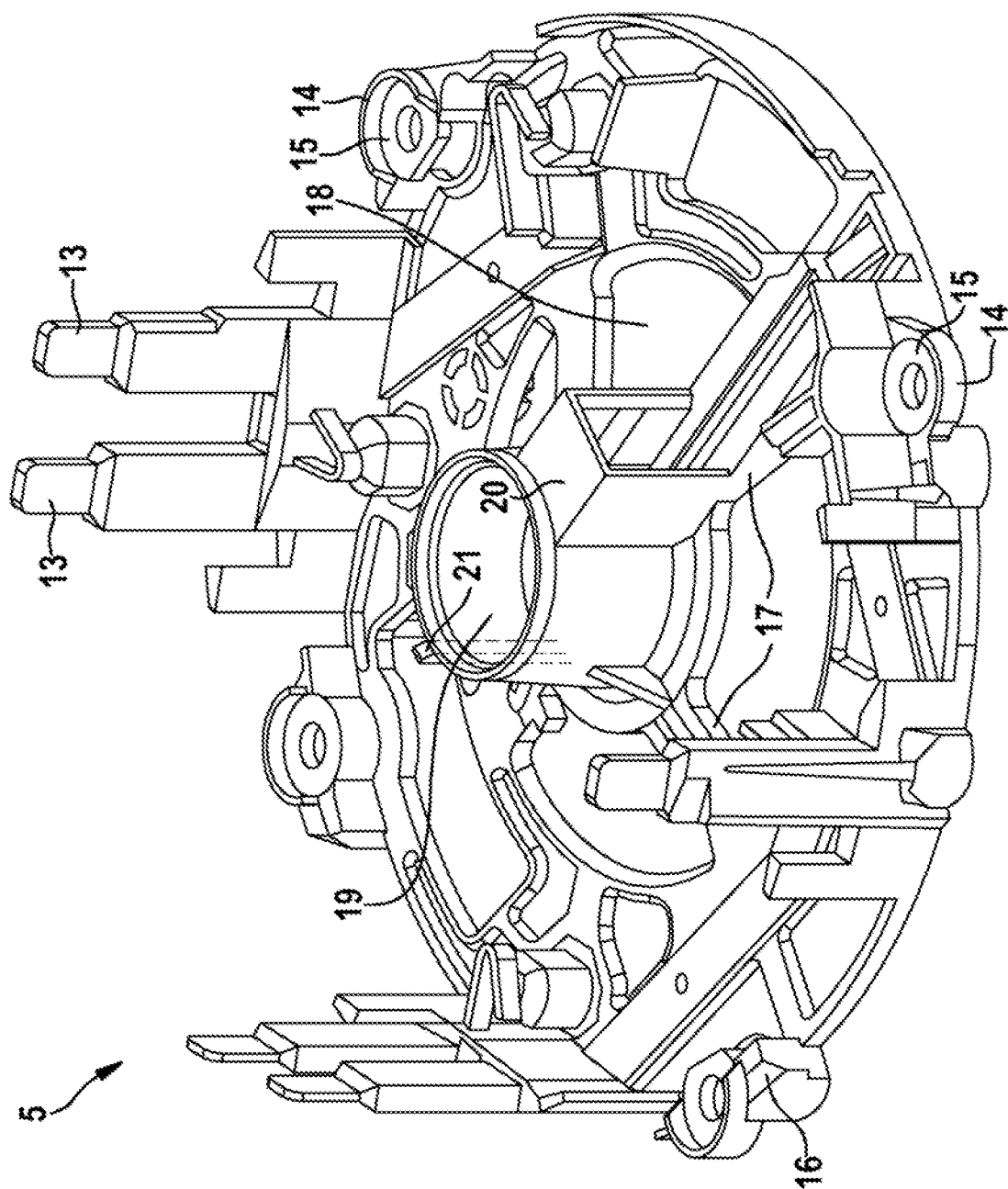

Additional advantages and practical designs can be found in the other claims, the Fig. description, and the drawings. In which:

FIG. 1 shows, in perspective view, an electric machine which is formed as an internal armature and the stator of which is enclosed between bearing shields, wherein a connection plate is being arranged on a bearing shield, FIG. 2 shows the connection plate in perspective view, with a central receiving socket for a slip ring, wherein axially protruding pressing elements are formed on the front side of the connection socket, FIG. 3 shows a section through the connection socket when assembled, FIG. 4 shows a connection plate in an additional design with an axial pressing rib formed on the outside of the outer casing.

In Figs. the same components are provided with the same reference marks.

The electric machine 1 shown in FIG. 1 is used, for example, as a generator in motor vehicles and is designed as an internal armature. The electric machine 1 comprises a stator 2 which is fixed at its opposite front sides by bearing shields 3 and 4. Adjacent to the bearing shield 4 is a connection plate 5, which is connected to the bearing shield 4 via connecting elements, in particular screws. The connection plate 5 is used for electrical contacting of stator-side windings.

On the side axially facing away from the stator, a heat sink 6 and a protective cap 7 are located on the connection plate 5. Additionally, the connection plate 5 is the support to power electronics 8, which includes an electrical interface 9 as well as electrical connection bolts 10 and 11 in order to establish a connection to a current source or a battery. A phase current is applied to the stator-side windings via the power electronics 8. Protective cap 7, heat sink 6, power electronics 8 and the connection plate 5 are screwed together with the bearing shield 4 to the stator 2.

In FIG. 2 the connection plate 5, which is made of plastic, is shown in perspective view. The connection plate 5 has several bus bars 13 distributed around the circumference of an outer ring 12, via which the stator windings are connected to the power electronics. Fastening eyes 14 are also formed on the outer ring 12, into which discs 15 are inserted; via the fastening eyes 14 and the discs 15, the connection plate 5, together with protective cap 7, heat sink 6 and power electronics 8, is connected via screws to the bearing shield 4. Several fastening eyes 14 with disks 15 inserted are distributed around the circumference.

Additionally, there are several form-fitting parts 16 on the outer ring 12, distributed over the circumference, in which a V-shaped groove is inserted and via which the protective cap 7 can be fixed in the radial direction.

Starting from the outer ring 12, support arms 17 extend radially inwards, wherein a recess or opening 18 remains free between adjacent support arms 17, through which a cooling air stream passes to the electric machine in order to cool it. Centrally in the connection plate 5, there is a receiving socket 19 which is held by the support arms 17 and serves to receive one or more slip rings which are arranged on the rotor shaft of the electric machine. The windings on the rotor side are energized via the slip rings. On the side adjacent to the receiving socket 19 there is a receiving 20 for a brush holder on a support arm 17 which carries a carbon brush which is in contact with the slip ring.

Axially projecting pressing elements 21 are integrally formed on the front side of the receiving socket 19. Distributed over the circumference, a total of three such pressing elements 21 are formed in one piece with the receiving socket 19 at an even distance, each of which has a similar design and protrudes axially beyond the front side of the receiving socket 19. The pressing elements 21 have the form of axially projecting knobs and protrude axially 0.1 mm to 1 mm beyond the front side of the receiving socket 19. When the connection plate 5 is assembled, the pressing elements 21 have the function of deforming by the connecting force with the stator-side component and thereby causing a tension of the connection plate 5, as a result of which the natural frequencies of the connection plate 5 change, in particular, increase. In this way, the frequency of the connection plate 5 can be detuned in such a way that it does not correspond to the excitation frequencies that occur during operation of the electric machine. It can be avoided that the connection plate 5 starts to vibrate during operation of the electric machine.

FIG. 3 schematically shows the connection plate 5 with the receiving socket 19 during assembly in the electric machine. The connection plate 5 abuts directly on the bearing shield 4 and is connected to it, e.g. screwed. On the side facing away from the bearing shield 4, the axially projecting pressing elements 21 on the front side of the receiving socket 19 are in contact with the heat sink 6, which is connected to the stator 2 via the screws and therefore forms a stator-side component, and are axially pressed by the connecting force. The axial pressing can be so strong that the front side of the receiving socket 19 also comes into contact with the heat sink 6. In the alternative design, a gap remains free between the front side of the receiving socket 19 and the heat sink 6, for example, to enable a cooling air stream to cool the brush and slip ring.

In addition to the pressing elements 21 and the front side of the receiving socket 19, there may be additional contact points between the connection plate 5 and the stator-side component, in particular, the heat sink 6. These are in particular the fastening eyes 14, via which the connection plate 5 is connected to the bearing plate. Elastic or plastic pressing is limited to the axially projecting portion of the pressing elements 21. All other contact points of the connection plate 5 to the heat sink 6 and to the bearing shield 4 are not subject to deformation.

FIG. 4 shows a connection plate 5 in a design variant. The connection plate 5 according to FIG. 4 essentially corresponds to that according to FIG. 2, so that reference is made to the description there. In contrast to FIG. 2, however, the pressing element 21 in FIG. 4 is formed as an axially extending pressing rib which extends on the outside of the casing of the connection socket 19 and in particular is formed in one piece with the receiving socket 19. The pressing rib 21 protrudes axially beyond the front side of the receiving socket 19, wherein the axial projection is preferably several millimeters. A gap between the front side of the receiving socket 19 and the heat sink 6 remains free in order to allow sufficient cooling of the brush and slip ring, in contrast to the axial pressing path of the pressing rib, which is preferably between 0.1 mm and 1 mm.

Exactly one pressing rib 21 is arranged around the circumference on the receiving socket 19, which is diametrically opposite the receiving 20 for the brush holder.

The invention claimed is:

1. Electric machine with a stator- and a connection plate for electrical contacting of windings of the stator, wherein the connection plate is connected to the stator or to a stator-side component via connecting elements, characterized in that at least one axially protruding pressing element is integrally formed on the connection plate, wherein the pressing element abuts on the stator or the stator-side component and is deformed by a connecting force between the connection plate and the stator or the stator-side component, the pressing element being arranged on a front side of a hollow, cylindrical receiving socket for a slip ring, the receiving socket being placed centrally in the connection plate and connected via radial support arms to an outer ring of the connection plate.

2. Electric machine according to claim 1, characterized in that the connection plate has at least one additional, deformation-free contact point to the stator or to the stator-side component.

3. Electric machine according to claim 1, characterized in that the pressing element is designed as axially protruding knobs.

4. Electric machine according to claim 3, characterized in that a plurality of the axially protruding knobs are arranged, which are along a circle.

5. Electric machine according claim 1, characterized in that the pressing element is designed as an axial pressing rib.

6. Electric machine according to claim 1, characterized in that the pressing element has a smaller wall thickness than the hollow cylindrical receiving socket.

7. Electric machine according to claim 1, characterized in that an axial pressing path of the pressing element is between 0.1 mm and 1 mm.

* * * * *